United States Patent
Yamamuka et al.

(10) Patent No.: US 7,830,819 B2
(45) Date of Patent: Nov. 9, 2010

(54) TRANSMISSION CHARACTERISTICS ANALYZING DEVICE AND PROGRAM

(75) Inventors: Miyuki Yamamuka, Tokyo (JP); Masashi Kitayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1122 days.

(21) Appl. No.: 11/464,240

(22) Filed: Aug. 14, 2006

(65) Prior Publication Data

US 2007/0242615 A1 Oct. 18, 2007

(30) Foreign Application Priority Data

Apr. 12, 2006 (JP) .............................. 2006-110046

(51) Int. Cl.
*H04L 12/28* (2006.01)
(52) U.S. Cl. ..................................................... 370/254
(58) Field of Classification Search ......... 370/254–256, 370/351, 464–466; 703/13, 18–20; 709/227–229
See application file for complete search history.

(56) References Cited

U.S. PATENT DOCUMENTS

| | | | |
|---|---|---|---|
| 6,141,634 A * | 10/2000 | Flint et al. ..................... 703/18 |
| 6,194,996 B1 * | 2/2001 | Okazaki et al. .............. 370/482 |
| 6,377,551 B1 * | 4/2002 | Luo et al. ..................... 370/238 |
| 6,941,576 B2 * | 9/2005 | Amit ........................... 725/143 |
| 6,965,303 B2 * | 11/2005 | Mollenkopf ................. 370/485 |
| 7,245,201 B1 * | 7/2007 | Kline et al. ............. 340/310.11 |
| 7,346,480 B1 * | 3/2008 | Pekarek et al. ................. 703/14 |
| 7,592,880 B2 * | 9/2009 | Magin ......................... 333/117 |

FOREIGN PATENT DOCUMENTS

| | | |
|---|---|---|
| JP | 10-269276 | 10/1998 |
| JP | 2003-044532 | 2/2003 |

\* cited by examiner

*Primary Examiner*—Dmitry H Levitan
(74) *Attorney, Agent, or Firm*—Leydig, Voit & Mayer, Ltd.

(57) ABSTRACT

A transmission characteristics analyzing device includes a transmission characteristics calculating unit for determining a direction in which a signal flows in each component of a communication network on the basis of a transmitting point and a receiving point of the signal, which are specified in the communication network, and for calculating the transmission characteristics of the communication network in consideration of the direction of the signal.

7 Claims, 12 Drawing Sheets

TRANSMISSION CHARACTERISTICS ANALYZING DEVICE AND PROGRAM

BACKGROUND OF THE INVENTION

1. Field of the Invention

The present invention relates to a transmission characteristics analyzing device which analyzes the transmission characteristics of a communication network, and a program which causes a computer to operate as the transmission characteristics analyzing device.

2. Description of Related Art

Recently, an information transmission technology for using, as a communication network, a power line, such as a power line which is wired indoors, has been developed, and actual use of the information transmission technology has been considered. Power lines are dedicated networks for power supply. Therefore, signal reflection or impedance mismatch sometimes degrades the transmission characteristics when a signal of a high frequency is transmitted by power distribution networks.

It is therefore necessary to analyze the transmission characteristics of a power line to point out locations where the transmission performance is degraded in the distribution power system and to study how to cope with the problem. There has been provided a transmission characteristics analyzing method (for example, refer to patent reference 1) using an equivalent circuit with connections of four-terminal circuit elements between an element for a transmitting point and an element for a receiving point to calculate the transmission characteristics of the network.

[Patent reference 1] JP, 2003-44532, A

Patent reference 1 is intended for a case where a lamp line in which only circuits which are equivalent when viewed from both their output and input sides (referred to as components with symmetric I/O from here on), such as cables, branch points, and terminals, exist as circuit elements is used as a communication network. Thus, the related art transmission characteristics analyzing method is based on the premise that only components with symmetric I/O exist. Therefore, the directions in which signals flow in the communication network are not taken into consideration, and, when a component with asymmetric I/O exists in the communication network, it is impossible to calculate the transmission characteristics of the communication network using the related art transmission characteristics analyzing method.

For example, when using a power line as a communication network, power always flows from a power source to a power load, but a signal changes its direction which it flows according to the transmitting and receiving points thereof. Unlike a communications dedicated liner a power line may include a component with asymmetric I/O, such as a transformer. A four-terminal circuit which is equivalent to such a component with asymmetric I/O differs according to the direction in which a signal flows through the four-terminal circuit. For this reason, when calculating the transmission characteristics of a power line, it is necessary to consider the direction in which the signal flows from its transmitting point to its receiving point, and to generate and combine four-terminal circuits according to the direction in which the signal flows.

SUMMARY OF THE INVENTION

The present invention is made in order to solve the above-mentioned problem, and it is therefore an object of the present invention to provide a transmission characteristics analyzing device which can analyze the transmission characteristics of a communication network even if the direction of a signal which flows through a component in the communication network is not constant and a component with asymmetric I/O exists in the communication network, and a program which causes a computer to operate as the transmission characteristics analyzing device.

In accordance with the present invention, there is provided a transmission characteristic analyzing device including a transmission characteristics calculating unit for determining a direction in which a signal flows in each of components in a communication network on the basis of a transmitting point and a receiving point of the signal, which are specified in the communication network, so as to calculate the transmission characteristics of the communication network in consideration of the direction of the signal.

Therefore, since the transmission characteristic analyzing device according to the present invention determines the direction in which the signal flows in each of components in the communication network on the basis of the transmitting and receiving points of the signal, which are specified in the communication network, so as to calculate the transmission characteristics of the communication network in consideration of the direction of the signal, the transmission characteristics analyzing device can analyze the transmission characteristics of the communication network even though the direction of the signal which flows in each of the components in the communication network changes according to the setting of the transmitting and receiving points of the signal in the communication network, and, in a case where each of the components in the communication network is expressed in the form of a four-terminal circuit, a component whose structure changes when its input terminal and output terminal are interchanged in the form of a four-terminal circuit (i.e., a component with asymmetric I/O) is included in the communication network. For example, when each component of an electric distribution system which is used as a communication network is expressed in the form of a four-terminal circuit, the transmission characteristic analyzing device according to the present invention can analyze the transmission characteristics of the electric distribution system properly.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

First, the outline of transmission characteristics analysis according to the present invention will be explained.

Figure 1:
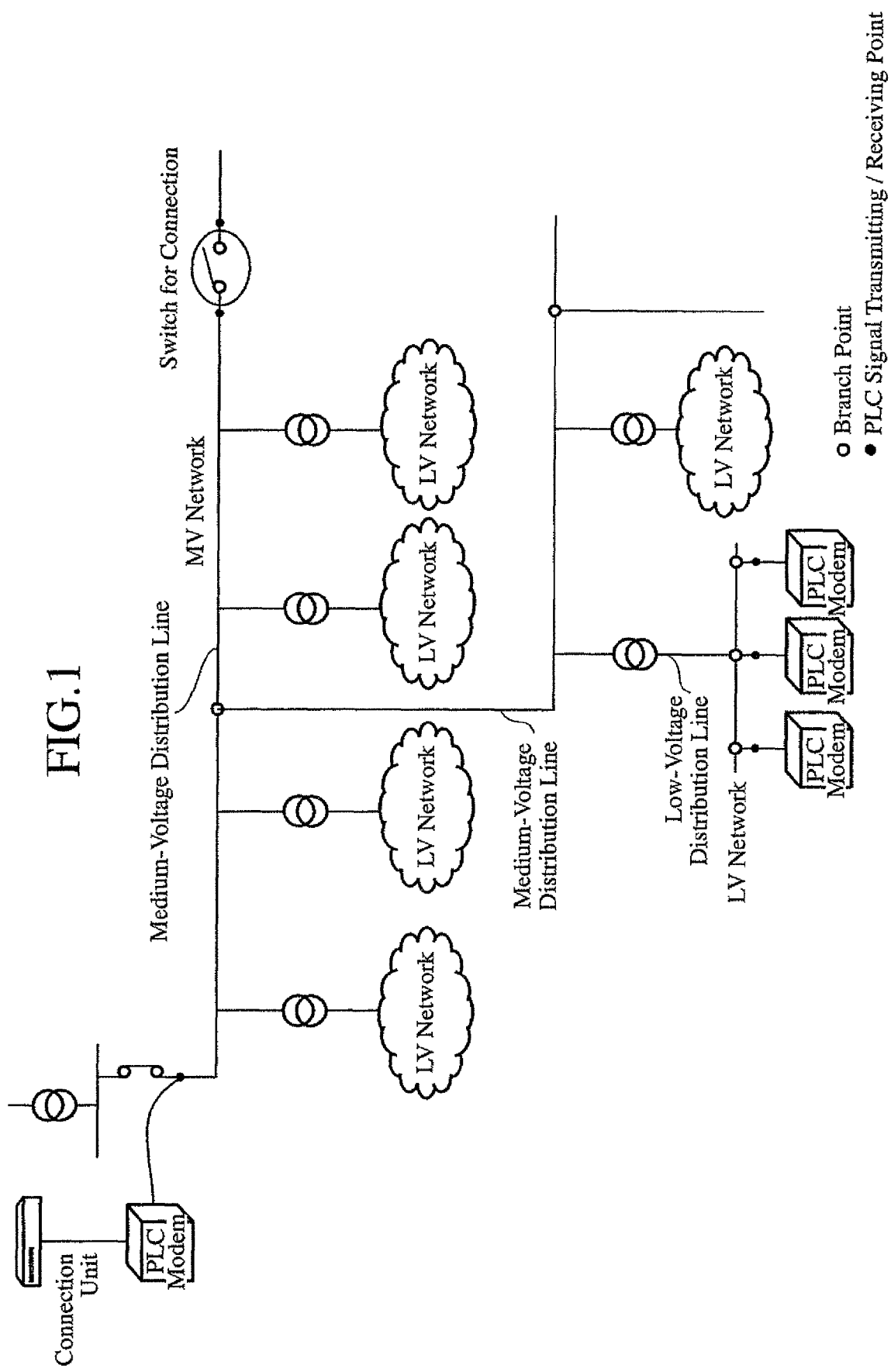
FIG. 1 is a diagram showing an example of an electric distribution system which is used as a communication network.

FIG. 1 is a diagram showing an example of an electric distribution system which is used as a communication network. In the example shown in FIG. 1, the electric distribution system has a structure in which a system at a higher level is connected to a medium-voltage distribution line via a transformer, and the medium-voltage distribution line is then connected to low-voltage distribution lines via transformers. In the figure, each part denoted by a white circle symbol which connects between distribution lines is a branch point, and the whole electric distribution system is constituted in a radial topology.

A PLC (Power Line Communication) modem is installed in each part denoted by a black dot symbol, and a PLC information signal can be transmitted to the network or received from the network with each PLC modem.

Figure 2:
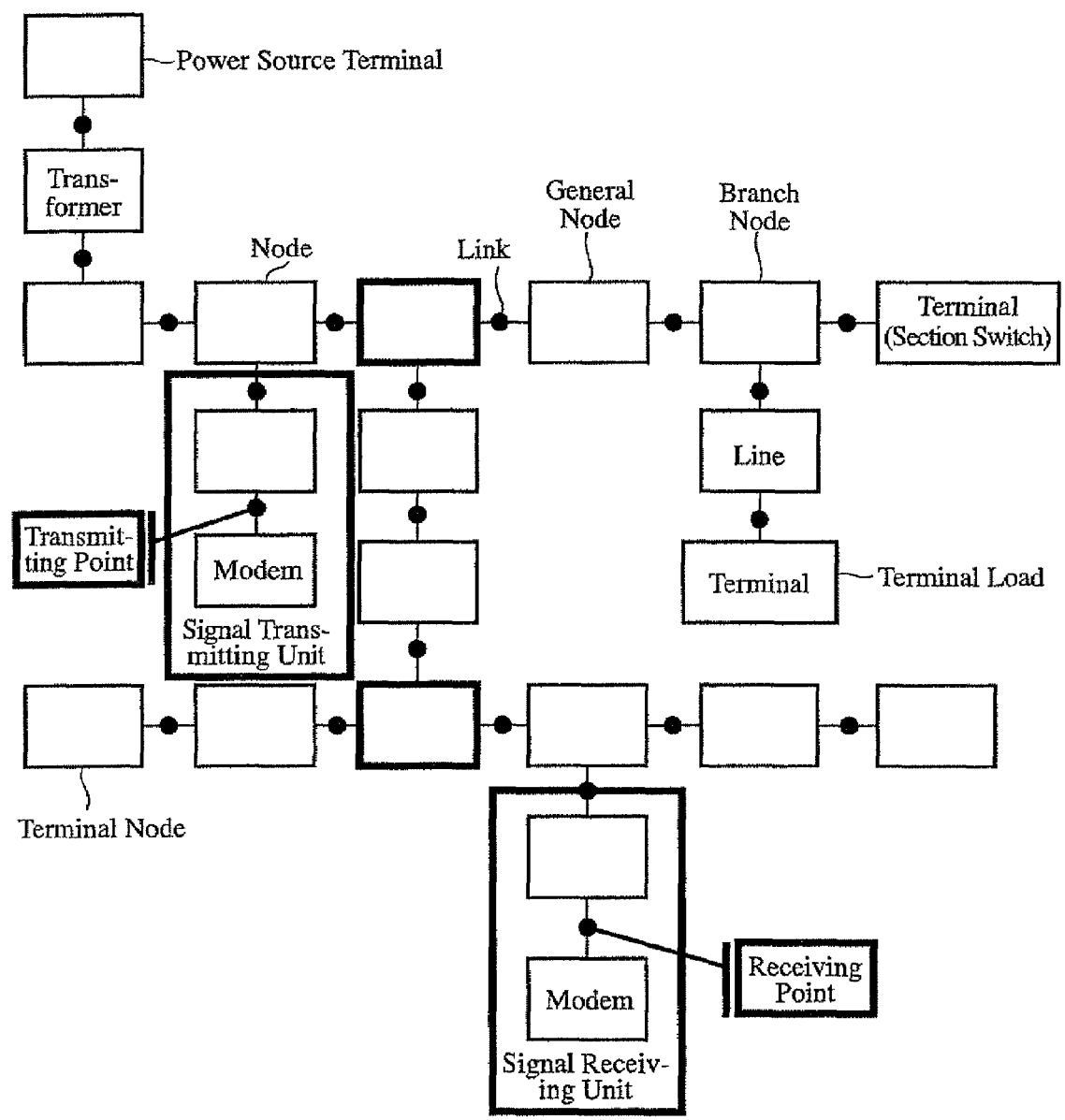
FIG. 2 is a diagram showing a modeled part of the electric distribution system shown in FIG. 1.

FIG. 2 is a diagram showing a modeled part of the electric distribution system shown in FIG. 1. In this figure, it is modeled using node models and link models. In FIG. 2, each node model is denoted by a square symbol, and each link model is denoted by a circular symbol. For example, each of components shown in FIG. 1, such transformers, switches, and distribution lines, is represented by a square node model, and each of components which connects two square node models is represented by a link model.

Particularly, node models each representing a terminal component which is a switch (e.g., a section switch) shown in FIG. 1, or a customer load are classified into terminal nodes, node models each representing a component which is located in the course of a line, such as a transformer, are classified into general nodes, and node models each representing a branch point denoted by a white circle symbol in FIG. 1 are classified into branch nodes (i.e., node models each enclosed by a thick line in FIG. 2), and other node models which are neither terminal nodes nor branch nodes, such as a transformer, are classified into general nodes. The classification of these node models will be explained later.

In the example shown in FIG. 2, a unit provided with a node model representing a PLC modem which transmits or receives a PLC signal, a node model representing a cable which connects the modem with the electric distribution system, a node model representing a coupling unit which is used to connect a modem to a power line, and a link model which connects among these node models can be expressed as a signal transmitting unit or a signal receiving unit (in the figure, this unit is surrounded by a solid line). Here, the link models in both the signal injecting unit and signal ejecting unit are specified as locations where a corresponding PLC signal is transmitted and received (i.e., a transmitting point (i.e., a point at which the signal is transmitted to the system)) and a receiving point (i.e., a point at which the signal is received from the system) in the figure), respectively.

There are three types of node models which are handled by the transmission characteristics analyzing device according to the present invention, as follows:

(1) Terminal nodes (2) Branch nodes (3) General nodes

A general node is a node model representing a component which is located on the way in the electric distribution system to be analyzed. For example, a general node corresponds to a component, such as a line or a transformer.

One general node is set up for each power distribution equipment.

A terminal node is a node model representing a component at a terminal of the electric distribution system. For example, a terminal node corresponds to a terminal component, such as a customer load or a section switch. A terminal node can be expressed as an impedance Z. A modem can be also represented by a terminal node. Furthermore, a power source can be virtually simulated as a terminal node with a virtual impedance Z0.

A branch node is a node model representing a branch point which does not have an impedance in the electric distribution system. For example, a busbar is power distribution equipment which can be expressed in the form of a branch node. Even when power distribution equipment does not exist in the electric distribution system, one branch node has to be virtually set up at each branch point in the electric distribution system.

Figure 3:
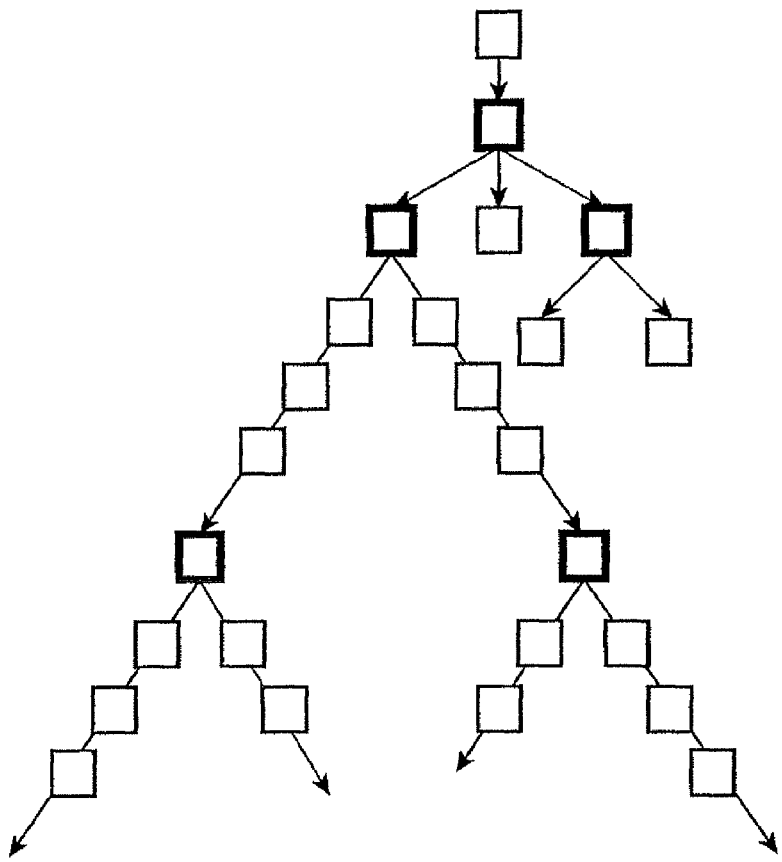
FIG. 3 is a diagram showing the model shown in FIG. 2 which is expressed in the form of a tree structure.

Since the present invention is based on the premise that the electric distribution system is used as a communication network, the communication network spreads in a radial topology because the power flows from the power source terminal to the other terminals. FIG. 3 shows a relation of connection of the electric distribution system model shown in FIG. 2 in a tree structure in consideration of the power flow. Each node model enclosed by a thick line is a branch node which corresponds to a branch point located at a connection between node models. In FIG. 3, for simplicity, although link models are not illustrated, a link model always exists between any two node models.

In a tree structure, the top node which has no superior is called the "root node" and nodes without children are called "leaves." A node is called a "parent" of another node if it is one step higher in the hierarchy and closer to the root node, and the other is called a "child" of the parent node. Furthermore, a node that is connected to all lower-level nodes is called an "ancestor." In accordance with the present invention, the power source terminal node is defined as the root node and the other terminals are defined as leaves.

Figure 4:
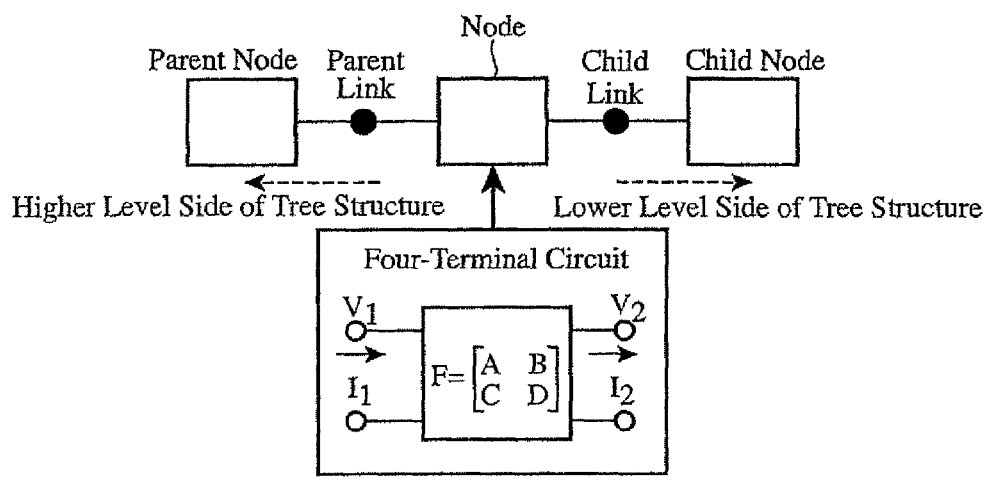
FIG. 4 is a conceptual diagram of a node model.

FIG. 4 is a conceptual diagram of a node model. In accordance with the present invention, it is assumed that the electric distribution system model has a tree structure in which nodes are linked as shown in FIG. 3. For this reason, a parent node and a child node are linked to a node model as shown in FIG. 4 which is classified into a general node. A link model which is located between the parent node and the node currently referenced is called a parent link, and a link model which is located between a child node and the node currently referenced is called a child link.

The node model shown in FIG. 4 can be expressed in the form of a four-terminal circuit (or a two-terminal-pair circuit) in which the parent link is defined as an input terminal and the child link is defined as an output terminal, for example. The transmission characteristics of a four-terminal circuit can be analyzed by performing a matrix operation using a matrix F including, as elements (i.e., F parameters), A, B, C, and D in the figure, as will be mentioned later.

Figure 5:
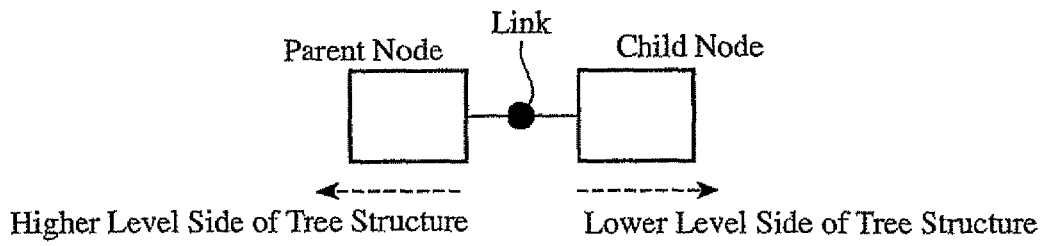
FIG. 5 is a conceptual diagram of a link model.

FIG. 5 is a conceptual diagram of a link model. A link model is set up between node models. A node model which lies above the link model is called a parent node, and a node model which lies below the link model is called a child node. For example, a link model represents a connection between a coupling unit and a modem. For this reason, a link model can be used to specify the transmitting or receiving point of a signal. The accordance with the present invention, a link model specified as the transmitting point of a signal is referred to as a transmitting link, and a link model specified as the receiving point of a signal is referred to as a receiving link.

Next, the transmission characteristics analysis using four-terminal circuits will be explained.

Figure 6:
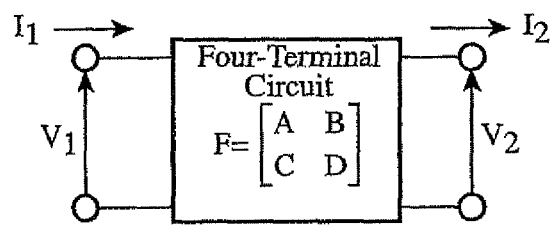
FIG. 6 is a diagram showing a four-terminal circuit.

FIG. 6 is a diagram showing a four-terminal circuit. Each node model in accordance with the present invention can be expressed in the form of a four-terminal circuit. In FIG. 6, $V_1$ is an input voltage, $I_1$ is an input current, $V_2$ is an output voltage, and $I_2$ is an output current. When the example shown in FIG. 4 is expressed in the form of a four-terminal circuit, the input voltage $V_1$, is the voltage of the parent link, and the input current $I_1$ is the current which flows from the parent link to the node model in question. Furthermore, the output voltage $V_2$ is the voltage of the child link, and the output current $I_2$ is the current which flows out of the child link.

A, B, C, and D which are the elements of the matrix F are called F parameters, and satisfy a relation given by the following equation (1). The element A shows the ratio ($V_1/V_2$) of the input voltage $V_1$ to the output voltage $V_2$ in a case where the output current $I_2$ is set to 0. The element B shows the ratio ($V_1/I_2$) of the input voltage $V_1$ to the output current $I_2$ in a case where the output voltage $V_2$ is set to 0. The element C shows the ratio ($I_1/V_2$) of the input current $I_1$ to the output voltage $V_2$ in a case where the output current $I_2$ is set to 0. The element D shows the ratio ($I_1/I_2$) of the input current $I_1$ to the output current $I_2$ in a case where the output voltage $V_2$ is set to 0.

$$\begin{bmatrix} V_1 \\ I_1 \end{bmatrix} = \begin{bmatrix} A & B \\ C & D \end{bmatrix} \begin{bmatrix} V_2 \\ I_2 \end{bmatrix} \quad (1)$$

A/C shows a driving-point impedance when viewed from the terminal pair on the input side of the four-terminal circuit in a case where the output current $I_2$ is set to 0, and B/D shows a driving-point impedance when viewed from the terminal pair on the input side of the four-terminal circuit in a case where the output voltage $V_2$ is set to 0. Thus, many electric parameters in each node model expressed in the form of a four-terminal circuit can be acquired by performing a matrix operation using the F parameters of the four-terminal circuit, and it is possible to analyze the transmission characteristics of the communication network by performing matrix operations on all node models in the network.

The fundamental nature of the F parameters will be explained.

Figure 7:
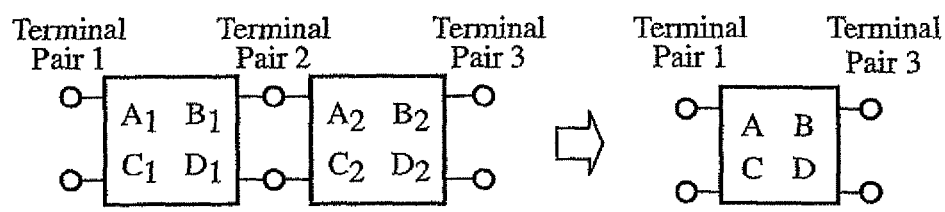
FIG. 7 is a diagram for explaining the combining of two four-terminal circuits.

When two four-terminal circuits are cascaded, they can be combined into a four-terminal circuit having, as two terminal pairs, a terminal pair 1 and a terminal pair 3, as shown on a right-hand side of an arrow shown in FIG. 7. In this case, when the F parameters of the two four-terminal circuits cascaded are expressed as ($A_1, B_1, C_1, D_1$) and ($A_2, B_2, C_2, D_2$), respectively, and the F parameters of the four-terminal circuit into which the cascaded two four-terminal circuits are combined are expressed as (A, B, C, D), the following equation (2) can be established:

$$\begin{bmatrix} A & B \\ C & D \end{bmatrix} = \begin{bmatrix} A_1 & B_1 \\ C_1 & D_1 \end{bmatrix} \begin{bmatrix} A_2 & B_2 \\ C_2 & D_2 \end{bmatrix} \quad (2)$$

Figure 8:
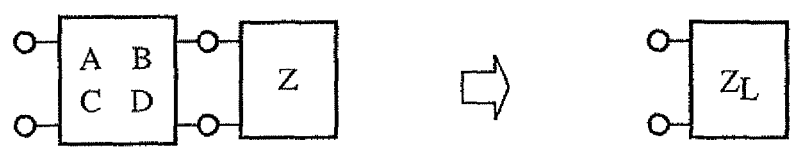
FIG. 8 is a diagram for explaining the combining of a four-terminal circuit and an impedance.

Furthermore, as shown in FIG. 8, when a four-terminal circuit has F parameters (A, B, C, D) and an impedance Z are cascaded, they can be combined into a circuit with an impedance $Z_L$. In this case, a relationship given by the following equation (3) is established between the input voltage $V_1$, input current $I_1$, output voltage $V_2$, and output current $I_2$ of the four-terminal circuit, and the impedances Z and $Z_L$. The impedance $Z_L$ can be acquired from this equation, and can be given by the following equation (4):

$$\begin{cases} \begin{bmatrix} V_1 \\ I_1 \end{bmatrix} = \begin{bmatrix} A & B \\ C & D \end{bmatrix} \begin{bmatrix} V_2 \\ I_2 \end{bmatrix} \\ V_2 = Z \cdot I_2 \\ V_1 = Z_L \cdot I_1 \end{cases} \quad (3)$$

$$Z_L = \frac{A \cdot Z + B}{C \cdot Z + D} \quad (4)$$

Figure 9:
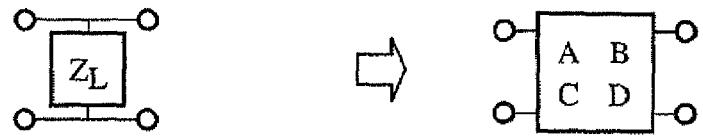
FIG. 9 is a diagram for explaining conversion of a parallel impedance into a four-terminal circuit.

Furthermore, as shown in FIG. 9, a parallel impedance $Z_L$ can be expressed in the form of a four-terminal circuit. In this case, since the input voltage $V_1$ is equal to the output voltage $V_2$, and the input current $I_1$ can be expressed as ($V_2/Z_L$)+$I_2$, F parameters (A, B, C, D) of the four-terminal circuit can be given by the following equation (5):

$$\begin{bmatrix} A & B \\ C & D \end{bmatrix} = \begin{bmatrix} 1 & 0 \\ 1/Z_L & 1 \end{bmatrix} \quad (5)$$

Figure 10:
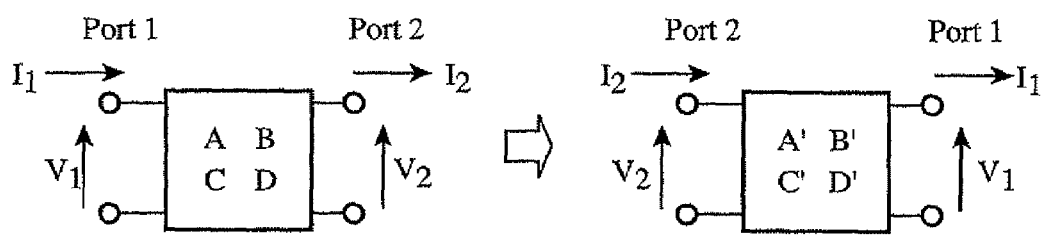
FIG. 10 is a diagram showing a four-terminal circuit having an input and an output which have a positional relationship which is inverse to that of an input and an output of another four-terminal circuit.

In an example shown in FIG. 10, a four-terminal circuit shown on a left-hand side of the figure has an input and an output which have a positional relationship which is inverse to that of the input and output of another four-terminal circuit shown on a right-hand side of the figure. In this case, when the F parameters of the four-terminal circuit shown on the left-hand side of the figure are expressed as (A, B, C, D), the F parameters (A', B', C', D') of the other four-terminal circuit shown on the right-hand side of the figure having the inverse relationship of the input and output are given by the following equation (6):

$$\begin{bmatrix} A' & B' \\ C' & D' \end{bmatrix} = \begin{bmatrix} D & B \\ C & A \end{bmatrix} \quad (6)$$

The detailed explanation about a four-terminal circuit and its F parameters are disclosed in Chapter 7 of the following reference. For example, the above-mentioned equation (2) is disclosed in pages 170 and 171 of the reference, the above-mentioned equation (5) is disclosed in page 172 of the reference, and the above-mentioned equation (6) is disclosed in pages 174 and 175 of the reference.

Reference: Hiroshi Hirayama and Tatsuo Otsuki, "Electric circuit theory [the 2nd edition]", the Institute of Electrical Engineers of Japan Thus, in accordance with the present invention, the electric distribution system model which is used as a communication network is expressed in the form of a tree structure, and each node model is expressed by the F parameters of the four-terminal circuit indicating various electric characteristics as mentioned above. In this case, the transmission characteristics of the electric distribution system model are analyzed in consideration of whether a signal on the communication network flows in the same direction as that of the power or in a direction opposite to that of the power, as will be mentioned later.

The structure and operation of the transmission characteristics analyzing device according to the present invention will be explained.

Figure 11:
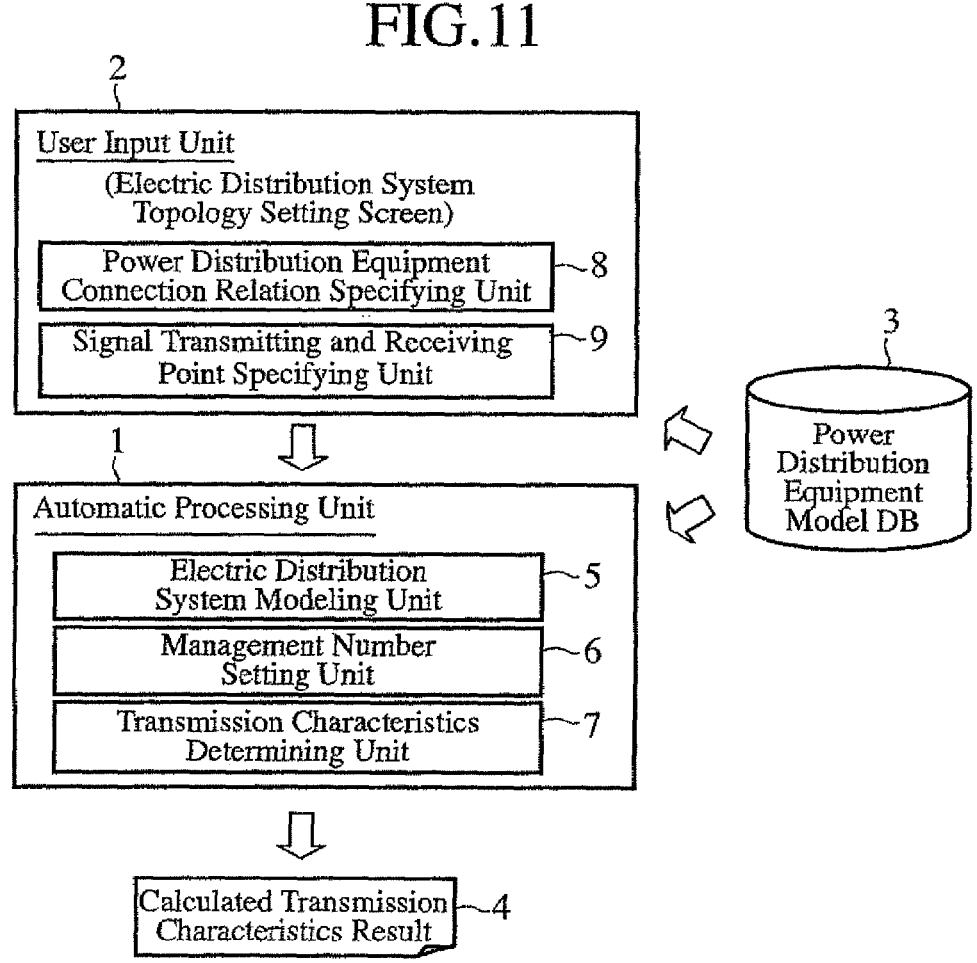
FIG. 11 is a block diagram showing the structure of a transmission characteristics analyzing device in accordance with embodiment 1 of the present invention.

FIG. 11 is a block diagram showing the structure of the transmission characteristics analyzing device in accordance with embodiment 1 of the present invention. The transmission characteristics analyzing device according to this embodiment 1 is provided with an automatic processing unit 1 and a user input unit 2, and obtains a calculated transmission characteristics result 4 using data stored in a power distribution equipment model database 3 (referred to as power distribution equipment model DB 3 from there on) by means of the components 1 and 2. The automatic processing unit 1 is provided with an electric distribution system modeling unit (i.e., a modeling unit) 5, a management number setting unit 6, and a transmission characteristics calculating unit 7.

The electric distribution system modeling unit 5 generates a node model which corresponds to each power distribution equipment in the electric distribution system using information about arrangement and connection of power distribution equipment models which are outputted from a power distribution equipment connection relation specifying unit 8, and model data read from the power distribution equipment model DB 3, and also sets up a link model between any two adjacent node models. In particular, the electric distribution system modeling unit 5 models the power source terminal using a terminal node with a virtual impedance Z0 (referred to as a power source terminal node from here on) and a link model (referred to as a power source terminal link from here on). This electric distribution system modeling unit 5 models the electric distribution system to be analyzed into a tree structure in which node models and link models are included with the power source terminal node being defined as the top thereof.

The management number setting unit 6 automatically assigns management numbers indicating a hierarchical relation of the tree structure to each of all the node models in the electric distribution system model generated by the electric distribution system modeling unit 5 in such a way as mentioned later.

The transmission characteristics calculating unit 7 calculates the transmission characteristics of a total section starting from the transmitting link and ending at the receiving link in the electric distribution system model. First, the general outlines of the operation of the transmission characteristics calculating unit 7 will be explained First, the transmission characteristics calculating unit 7 acquires a branch node (referred to as a transmitting/receiving branch node from here on) which is a common ancestor of the transmitting link and the receiving link and is the closest to them, using the management numbers set by the management number setting unit 6. Then, the transmission characteristics calculating unit 7 divides the total section into a section 1 starting from the receiving link and ending at a child link of the transmitting/receiving branch node, a section 2 starting from the transmitting link and ending at the child link of the transmitting/receiving branch node and a section 3 starting from the root node (i.e., the power source terminal node) and ending at a parent link of the transmitting/receiving branch node. The transmission characteristics calculating unit 7 then determines that in the section 1 the signal flows in the same direction as that in which the power flows, and in the sections 2 and 3 the signal flows in a direction opposite to that in which the power flows, and generates and combines four-terminal circuits which correspond to node models, respectively, into a combined four-terminal circuit in each of these sections and further combines the combined four-terminal circuit in the sections into a combined four-terminal circuit. The transmission characteristics calculating unit 7 then calculates the parameter values which specify the transmission characteristics of the total section starting from the transmitting link and ending at the receiving link from the finally-combined four-terminal circuit. The details of the analysis processing done by the transmission characteristics calculating unit 7 will be explained later.

The user input unit 2 is provided with the power distribution equipment connection relation specifying unit 8 and a signal transmitting and receiving points specifying unit 9, and offers a GUI (Graphical User Interface) for enabling the user to specify a relation of connection among all the pieces of power distribution equipment and the transmitting and receiving points of the signal through an electric distribution system topology editing screen displayed on a display which the transmission characteristics analyzing device according to this embodiment 1 has.

In order to enable the user to set up an electric distribution system topology, a window, an icon, and so on for enabling the user to specify a power distribution equipment model which is to be stored in the power distribution equipment model DB 3, and to visually specify the transmitting and receiving points of a signal in the electric distribution system are displayed on the electric distribution system topology editing screen. Thereby, the user can specify the relation of connection among all pieces of power distribution equipment included in the electric distribution system to be analyzed by performing an operation, such as an operation of placing power distribution equipment models or producing connections among all the pieces of power distribution equipment on the electric distribution system topology editing screen, using an input device, such as a mouse.

The power distribution equipment connection relation specifying unit 8 implements a GUI about the arrangement and connection of power distribution equipment models on the electric distribution system topology editing screen. The information about the arrangement and connection of power distribution equipment models which the user has specified according to the electric distribution system topology editing screen is sent to the electric distribution system modeling unit 5 by the power distribution equipment connection relation specifying unit 8. Thereby, the electric distribution system modeling unit 5 generates electronic data about the electric distribution system topology having the relation of connection among all the pieces of power distribution equipment which the user has specified using the power distribution equipment model data stored in the power distribution equipment model DB 3. Furthermore, the power distribution equipment connection relation specifying unit 8 implements a GUI about the specification of the location of the power source terminal and the virtual impedance Z0. The power flows from the power source terminal to the other terminals in the set-up electric distribution system radial topology.

The signal transmitting and receiving points specifying unit 9 implements a GUI about the specification of the transmitting and receiving points of the signal on the electric distribution system topology editing screen. The information about the transmitting and receiving points of the signal which the user has specified according to the electric distribution system topology editing screen is outputted to the electric distribution system modeling unit 5 by the signal transmitting and receiving points specifying unit 9. Thereby, the electric distribution system modeling unit 5 sets up the link models corresponding to the transmitting and receiving points of the signal as the transmitting and receiving links, respectively, for the data about the electric distribution system topology generated from the information from the power distribution equipment connection relation specifying unit B.

The power distribution equipment model DB 3 stores the electronic data about all the pieces of power distribution equipment model which constitute the electric distribution system on a model-ID-by-model-ID basis, model IDs each indicating the type of corresponding power distribution equipment, such as a transformer or cable. The power distribution equipment model DB 3 also stores data required to generate the F parameters of a four-terminal circuit which represents each of all the pieces of power distribution equipment in the electric distribution system.

The following attributes are set to each node model in the electric distribution system model.

(1) A node number (2) A corresponding power distribution equipment model ID (3) A node type (i.e., information indicating whether a node model in question is a general node type, a terminal node type, or a branch node type)

(4) One set of a parent node number and a parent link number (5) F parameters in a case where corresponding power distribution equipment is expressed in the form of a four-terminal circuit (6) A node management number A (7) A node management number B (8) One or more sets of a child node number and a child link number The attributes (1) to (5), and (8) are set up by the electric distribution system modeling unit 5, and the attributes (6) and (7) are set up by the management number setting unit 6.

A node number shown in (1) is an ID number assigned to each node in order to identify each node, and can be any number which enables each node model to be identified. A parent node number shown in (4) is an ID number assigned to a node model which corresponds to a parent node, and a parent link number shown in (4) is an ID number assigned to a link model which corresponds to a parent link. In accordance with this embodiment, since it is assumed that the electric distribution system is a radial one, there exist one parent node and one parent link which are managed for the node currently referenced.

A child node number shown in (8) is an ID number assigned to a node model which corresponds to a child node, and a child link number shown in (8) is an ID number assigned to a link model which corresponds to a child link. In the radial electric distribution system, while there exist one parent node and one parent link which are managed for the node currently referenced, as previously mentioned, there exist one or more child nodes in a branch node and one link between the branch node and each child node. For this reason, one or more sets of a child node number and a child link number are managed for the node currently referenced.

Each of the node management number A shown in (6) and node management number B shown in (7) of the node currently referenced has information about a branch node which is an ancestor of the node currently referenced. Specifically, the node management number A has information about the node management number A of a branch node which is an ancestor of the node currently referenced, and the node management number B shows the how manieth node the node currently referenced is when counted from the nearest branch node that exists at a higher level of the hierarchy.

For example, when the node management number A of the node currently referenced is "x1x2x3*000000" and the node management number B of the node is "y1", three branch nodes having node management numbers A of "x1x2x3000000", "x1x20000000", and "x100000000" exist as ancestors of the node currently reference. In this case, "1x2x3" in the node management number A of the node currently referenced is information about the node management numbers A of branch nodes which are ancestors of the node currently reference, and a serial number indicating the how-manieth child node the node currently referenced is set to *.

Each of the electric distribution system modeling unit 5, management number setting unit 6, transmission characteristics calculating unit 7, power distribution equipment connection relation specifying unit 8, and signal transmitting and receiving points specifying unit 9 which are mentioned above can be implemented as a concrete means in which hardware and software operate in cooperation with each other by, for example, making a processing unit of a computer which constitutes the transmission characteristics analyzing device according to this embodiment 1 execute a transmission characteristics analyzing program which is consistent with the purposes of the present invention, and controlling the operation of the processing unit.

The power distribution equipment model DB 3 can be stored in, for example, a hard disk drive unit which is mounted in the computer which constitutes the transmission characteristics analyzing device according to this embodiment 1, or a data server or a large-scale recording medium which can be connected to the transmission characteristics analyzing device via a network or the like.

In the following explanation, since the structure and fundamental functions of the computer which embodies the transmission characteristics analyzing device according to the present invention can be easily recognized by those skilled in the art on the basis of the technical common knowledge of the field of the present invention, and they are not directly in connection with the essence of the present invention, the detailed explanation of the structure and fundamental functions of the computer will be omitted hereafter.

Next, the operation of the transmission characteristics analyzing device in accordance with this embodiment of the present invention will be explained.

Figure 12:
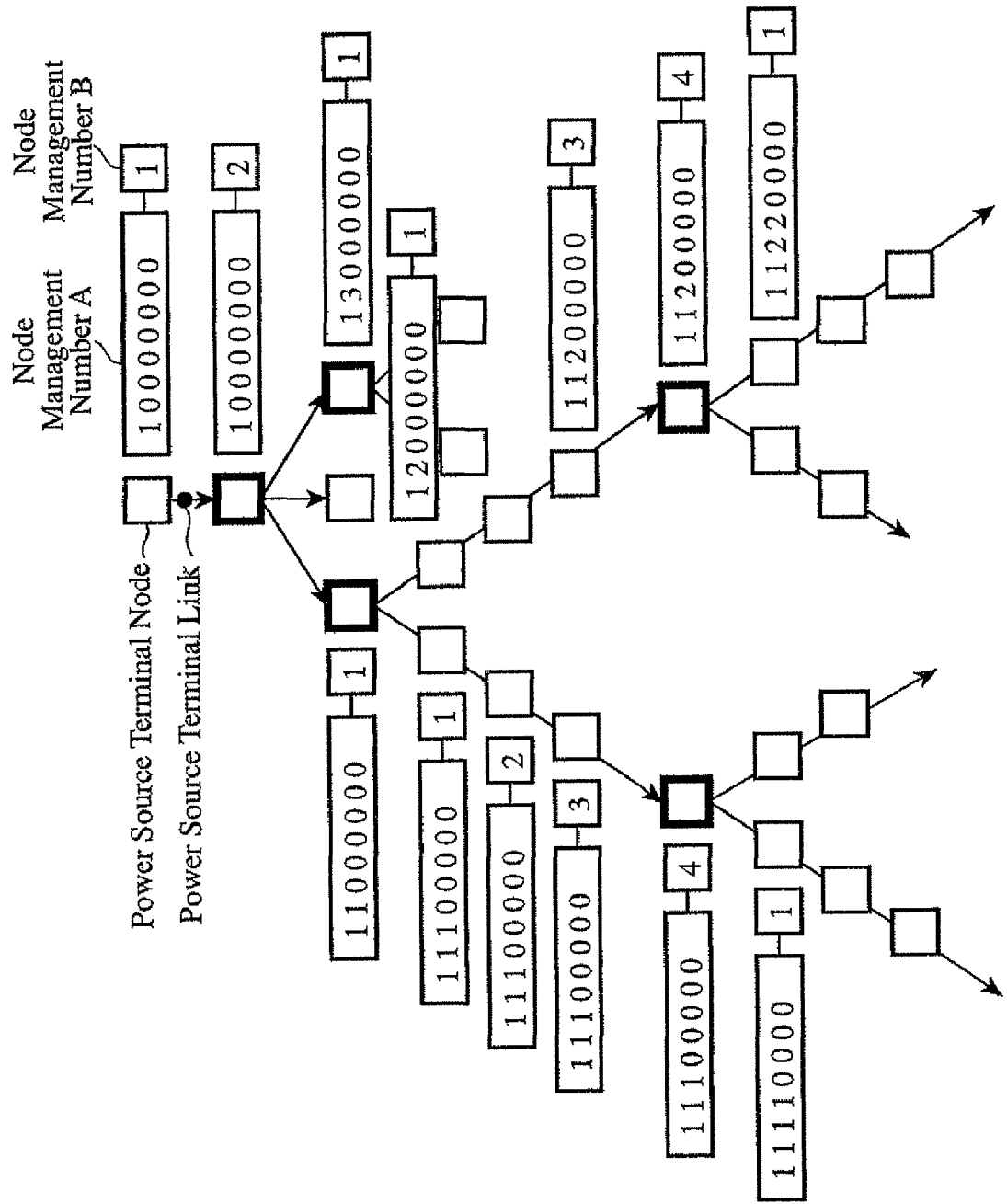
FIG. 12 is a diagram for explaining the outline of a process of assigning node management numbers to each node.

FIG. 12 is a diagram for explaining the outline of the node management number setting processing carried out by the management number setting unit 6. Node management numbers A and B are assigned to each of all the nodes included in the electric distribution system to be analyzed as follows.

When a tree corresponding to the electric distribution system as shown in FIG. 3 is generated by the electric distribution system modeling unit 5, the management number setting unit 6 automatically assigns node management numbers A and B indicating the hierarchical relation of all the node models in the tree structure to each of all the node models in this tree. The management number setting unit 6 carries out the assignment of node management numbers A and B according to the following procedure.

(1) Assignment of Node Management Numbers A and B to the Root Node

Since the power source terminal node is the root node of the tree, the management number setting unit 6 assigns "10000000", as a node management number A, and "1", as a node management number B, to the power source terminal node, as shown in FIG. 12.

(2) Assignment of Node Management Numbers A and B to Nodes Other Than the Root Node (a) When the Parent Node of the Node is a Branch Node For example, in FIG. 12, a child node of the power source terminal node is a parent node of three child nodes and is also a branch node.

Assuming that the power source terminal node which is the parent node of the node which is a general node, "10000000" which is the node management number A of the power source terminal node is assigned to the child node of the power source terminal node, just as it is, as will be mentioned later. Furthermore, a node management number B of "2" which is acquired by incrementing "1" which is the node management number B of the power source terminal node by 1 is assigned to the child node of the power source terminal node. The child node of the power source terminal node has three child nodes, as shown in FIG. 12.

As mentioned above, the node management number A assigned to the node currently referenced includes information about the node management number A of a branch node which is as an ancestor of the node currently referenced. Therefore, "11000000", "12000000", and "13000000" in each of which "1" which is the leftmost digit of "10000000" which is the node management number A of the parent node is set as the leftmost digit thereof, and in which serial numbers 1, 2, and 3 corresponding to the three child nodes are set as the second leftmost digits thereof are assigned, as node management numbers A, to the child nodes 1, 2, and 3, respectively.

When the node management number A of a branch node which is a parent node has two or more leftmost digits other than zero, node management numbers A in each of which the two or more leftmost digits of the node management number A of the parent node are set as the two or more leftmost digits thereof, and in which serial numbers corresponding to the two or more child nodes are set as the third or further leftmost digits thereof are assigned, as node management numbers A, to the two or more child nodes, respectively.

Furthermore, since each of the child nodes 1, 2, and 3 is the first one when counted from the branch node which is a parent node, "1" is assigned, as a node management number B, to each of the child nodes 1, 2, and 3.

Assuming that information about the node management number A of a branch node which is an ancestor of the parent node is x1x2x3, the node management number A of the parent node which is the branch node is "x1x2x3 0000000", and the node management number B of the parent node is "y1", node management numbers A and B are assigned to each of child nodes 1, 2, 3, . . . , as follows:

Parent node Management number A: "x1x2x3 0000000" Management number B: y1

Child node 1 Management number A: "x1x2x3 1000000" Management number B:1

Child node 2 Management number A: "x1x2x3 2000000" Management number B:1

Child node 3 Management number A: "x1x2x3 3000000" Management number B:1

In the case of the node (i.e., a box drawn with a thick line) which is located just under the power source terminal node shown in FIG. 12 and which is connected directly to the power source terminal node, and its three child nodes, since the node management number A of the parent node which is a branch node is "10000000", x1x2x3=1 and "11000000", "12000000", and "113000000" are assigned to the child nodes 1, 2, and 3, respectively.

(b) When the Parent Node is a General Node

When the parent node is a general node, the node management number A of the parent node is set to the node management number A of the child node, just as it is, and a value which is obtained by incrementing the node management number B of the parent node by 1 is set to the node management number B of the child node.

For example, when the node management number A of the parent node is "x1x2x3 000000" and the node management number B of the parent node is "y1", the node management number of the child node is set as follows:

Parent node Management number A: "x1x2x3 000000" Management number B: y1

Child node 1 Management number A: "x1x2x3 000000" Management number B: y1+1

As shown In FIG. 12, three sets of "node management number A"—"node management number B": "11100000"—"1", "11100000"—"2", and "11100000"—"3" are assigned as the node management numbers A and B of three nodes which are cascaded, respectively.

Thus, the assignment of a node management number A to each node makes it possible to recognize one or more branch nodes which are ancestors of the node currently referenced. Referring now to FIG. 12, when the node currently referenced is a node whose node management number A is "11110000", it can be recognized that there exist three branch nodes whose node management numbers A are "11100000", "11000000", and "10000000", respectively, as ancestors of the node currently referenced (in the figure, each of the three branch nodes is denoted by a box drawn with a thick line). On the other hand, when the node currently referenced is a node whose node management number A is "11220000", it can be recognized that there exist three branch nodes whose node management numbers A are "11200000", "11000000", and "10000000", respectively, as ancestors of the node currently referenced.

It is also possible to grasp both information indicating at which higher level the nearest branch node exists when counted from the node currently referenced and the node management number A of the branch node from the node management numbers A and B of the node currently referenced. Referring now to FIG. 12, when the node management number A of the node currently referenced is "11100000", and the node management number B of the node currently referenced is "3", the nearest branch node that exists as an ancestor of the node currently referenced is three steps higher in the hierarchy than the node currently referenced, and it can be recognized that the node management number A of the nearest branch node is "11000000."

When the management number setting unit 6 thus assigns node management numbers A and B to each of all the nodes included in the electric distribution system to be analyzed, as mentioned above, the transmission characteristics calculating unit 7 calculates the transmission characteristics of the electric distribution system.

Figure 13:
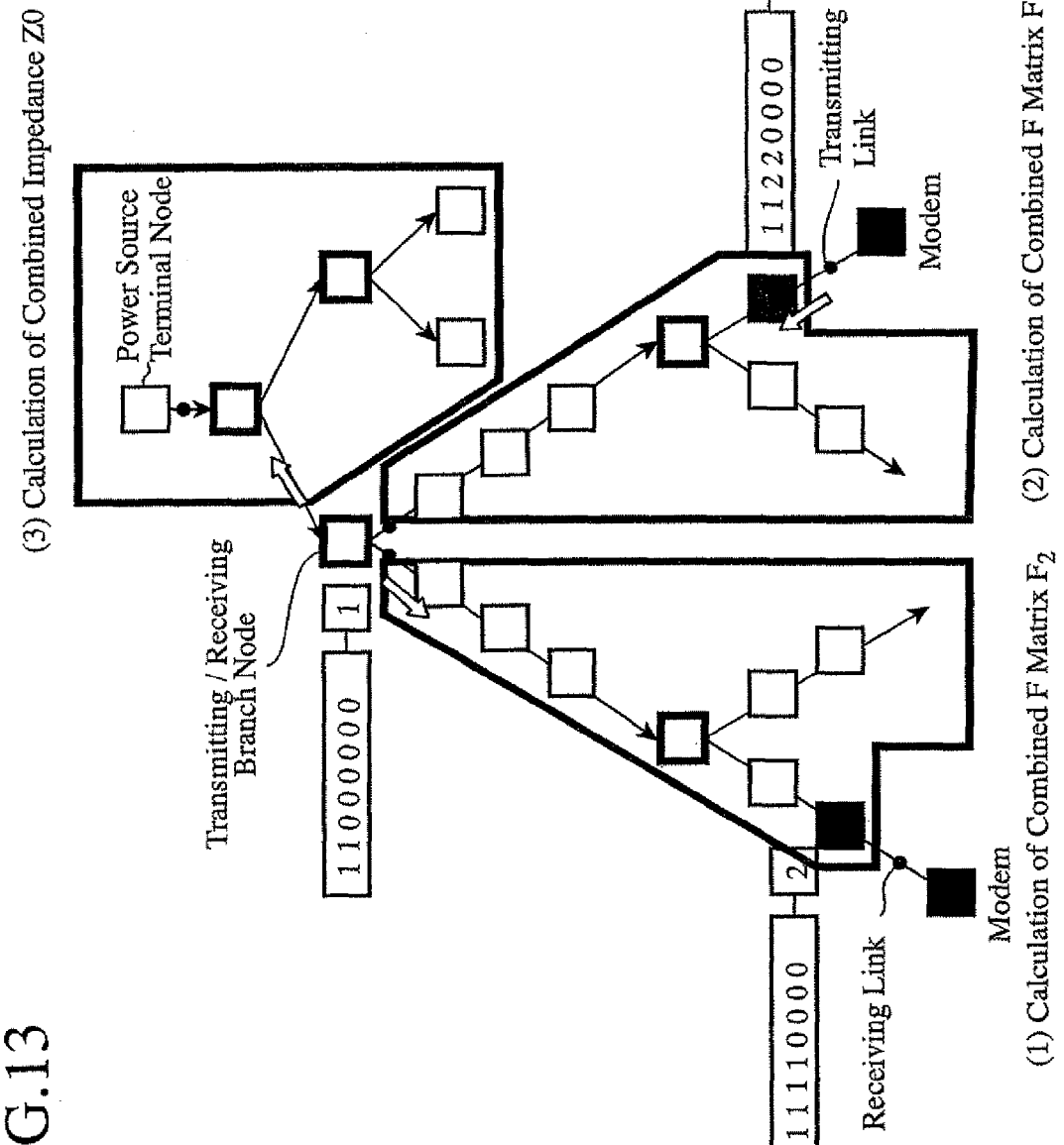
FIG. 13 is a diagram for explaining the outline of transmission characteristics calculation processing.

FIG. 13 is a diagram for explaining the outline of the transmission characteristics calculation processing carried out by the transmission characteristics calculating unit 7. In this embodiment, the target for the transmission characteristics calculation processing is the electric distribution system shown in FIG. 2.

The procedure of the transmission characteristics calculation is as follows.

(Step 1) Acquire the transmitting/receiving branch node.

(Step 2) Calculate a combined F matrix $F_2$ by combining four-terminal circuits representing nodes starting from the child link of the transmitting/receiving branch node and ending at the receiving link (refer to (1) in FIG. 13).

(Step 3) Calculate a combined F matrix $F_1$ by combining four-terminal circuits representing nodes starting from the transmitting link and ending at the child link of the transmitting/receiving branch node (refer to (2) in FIG. 13).

(Step 4) Calculate a combined impedance Z0 by combining four-terminal circuits representing nodes at higher levels of the hierarchy starting from the parent link of the transmitting/receiving branch node (refer to (3) in FIG. 13).

(Step 5) Calculate a combined F matrix associated with the section starting from the transmitting link and ending at the receiving link from the combined F matrix $F_2$, combined F matrix $F_1$, and combined impedance Z0.

(Step 6) Calculate the transmission characteristics of the section starting from the transmitting link and ending at the receiving link.

(1) Step 1 of the Transmission Characteristics Calculation Processing

In step 1 of the transmission characteristics calculation processing, the transmission characteristics calculating unit 7 acquires the transmitting/receiving branch node as follows.
(Step 1-1) The transmission characteristics calculating unit 7 determines the node management number A of the transmitting/receiving branch node first.

When the node management number A of a parent node linked to the transmitting link is "x1x2x3x4...", and the node management number A of a parent node linked to the receiving link is "y1y2y3y4...", the node management number A of the transmitting/receiving branch node is "x1x2x3 0 000000." In this case, x1=y1, x2=y2, x3=y3, x4≠y4, x4≠0, and y4≠0.

In the example of FIG. 13, since the node management number A of a parent node linked to the transmitting link is "11220000" and the node management number A of a parent node linked to the receiving link is "11110000", a common part of these node management numbers A which indicates information about the node management number A of a branch node at a higher level of the hierarchy is the two leftmost digits "11" of them. Thereby, the node management number A of the transmitting/receiving branch node is determined to be "11000000".

(Step 1-2) The transmission characteristics calculating unit 7 then acquires the transmitting/receiving branch node on the basis of the determined node management number A.

In this process, the transmission characteristics calculating unit 7 sequentially searches for a parent node having the node management number A determined in step 1-1 from the receiving link, and defines the searched parent node having the node management number A as the transmitting/receiving branch node.

(2) Step 2 of the Transmission Characteristics Calculation Processing

Figure 14:
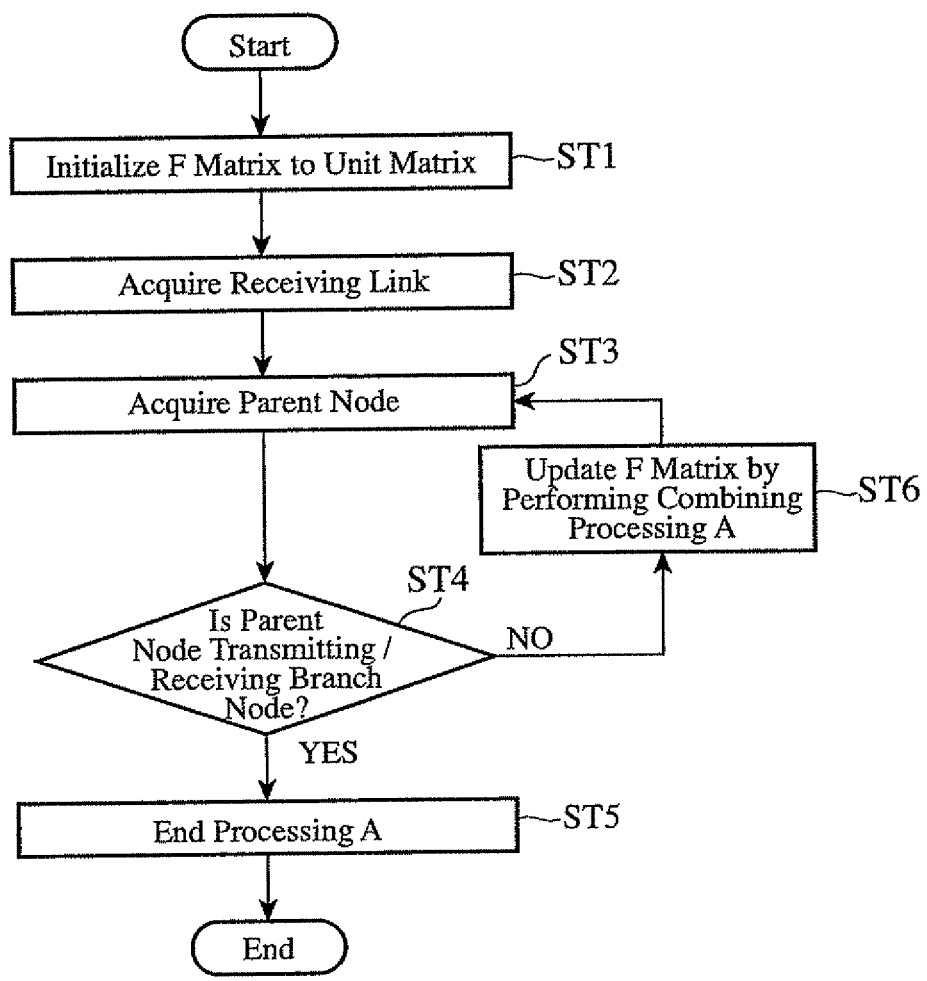
FIG. 14 is a flow chart showing a flow of step 2 of the transmission characteristics calculation processing.

FIG. 14 is a flow chart showing a flow of step 2 of the transmission characteristics calculation processing, and showing the process of combining four-terminal circuits representing nodes in FIG. 13 starting from the child link of the transmitting/receiving branch node and ending at the receiving link.

First, when receiving the node management number A of the transmitting/receiving branch node acquired in step 1, the transmission characteristics calculating unit 7 initializes an F matrix to the unit matrix (in step ST1).

The transmission characteristics calculating unit 7 then acquires the receiving link in the electric distribution system to be processed (in step ST2), and acquires a parent node linked to this receiving link (in step ST3).

The transmission characteristics calculating unit 7 then judges whether or not the acquired parent node is the transmitting/receiving branch node on the basis of the node management number A of the transmitting/receiving branch node (in step ST4).

When, in step ST4, judging that the parent node is not the transmitting/receiving branch node, the transmission characteristics calculating unit 7 updates the F matrix by performing combining processing A in such a manner as mentioned below according to whether the parent node is a general node or a branch node (in step ST6).

When completing the process of updating the F matrix, the transmission characteristics calculating unit 7 returns to the process of step ST3 to acquire a parent node at the further higher level of the hierarchy, and then performs the process of step ST4.

Next, the combining processing A will be explained.

The combining processing A is a process of updating the F matrix in a case of performing processing in a direction from a lower level side to a higher level side. In this combining processing A, the following processes are carried out according to the node type of the acquired parent node.

(a) When the Acquired Parent Node is a General Node

When the current F matrix is expressed as F and the F matrix of the acquired parent node is expressed as $F_2$, the transmission characteristics calculating unit 7 updates the F matrix by calculating $F_2 \times F$.

(b) When the Acquired Parent Node is a Branch Node

Figure 15:
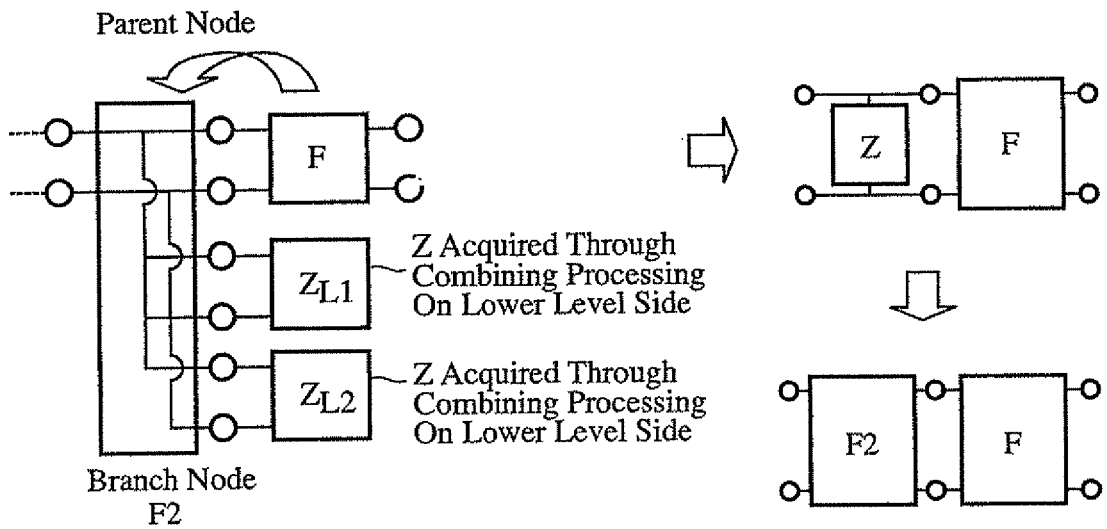
FIG. 15 is a schematic diagram explaining a process of updating an F matrix by performing combining processing A in a case where an acquired parent node is a branch node.

The transmission characteristics calculating unit 7 performs combining processing on lower level side, which will be mentioned below, on each of all child nodes (except already-processed child nodes) at lower levels of the hierarchy which are linked to the acquired parent node which is a branch node so as to calculate a combined impedance. FIG. 15 is a schematic diagram for explaining the process of updating the F matrix through the combining processing A in a case where the acquired parent node is a branch node.

In the example shown in FIG. 15, the transmission characteristics calculating unit 7 performs combining processing on lower level side, which will be mentioned below, on each of all the descendants of the acquired parent node so as to calculate combined impedances $Z_{L1}, Z_{L2}, \ldots$. Since these child nodes are connected in parallel, the transmission characteristics calculating unit 7 calculates the combined impedance Z of the combined impedances $Z_{L1}, Z_{L2}, \ldots$ of the child links according to the following equation (7) (see an upper right-hand side diagram of FIG. 15 shown by a first arrow extending from a left-hand side diagram of FIG. 15).

$$Z = \frac{1}{1/Z_{L1} + 1/Z_{L2} + \ldots}. \tag{7}$$

After calculating the combined impedance Z, the transmission characteristics calculating unit 7 further calculates the F matrix ($F_2$) of the acquired parent node which is a branch node by substituting Z calculated according to the above-mentioned equation (7) into the combined impedance $Z_L$ of the above-mentioned equation (5) (see a lower right-hand side diagram of FIG. 15 shown by a second arrow extending from the upper right-hand side diagram of FIG. 15). After that, as shown in FIG. 15, the transmission characteristics calculating unit 7 sets the current F matrix to F and sets the F matrix of the calculated parent node (branch node) to $F_2$ so as to update the F matrix by calculating $F_2 \times F$.

Figure 16:
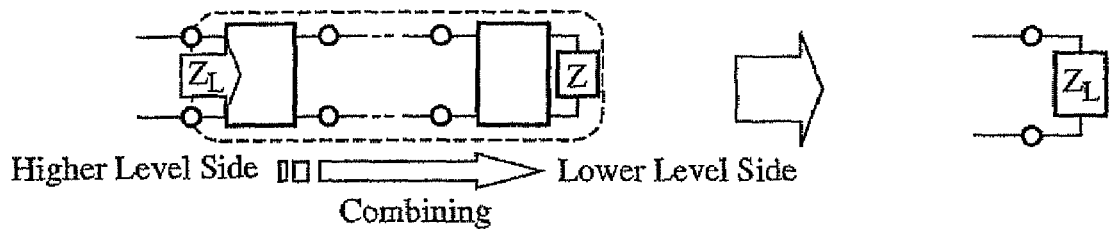
FIG. 16 is a conceptual diagram of combining processing on lower level side.
Figure 17:
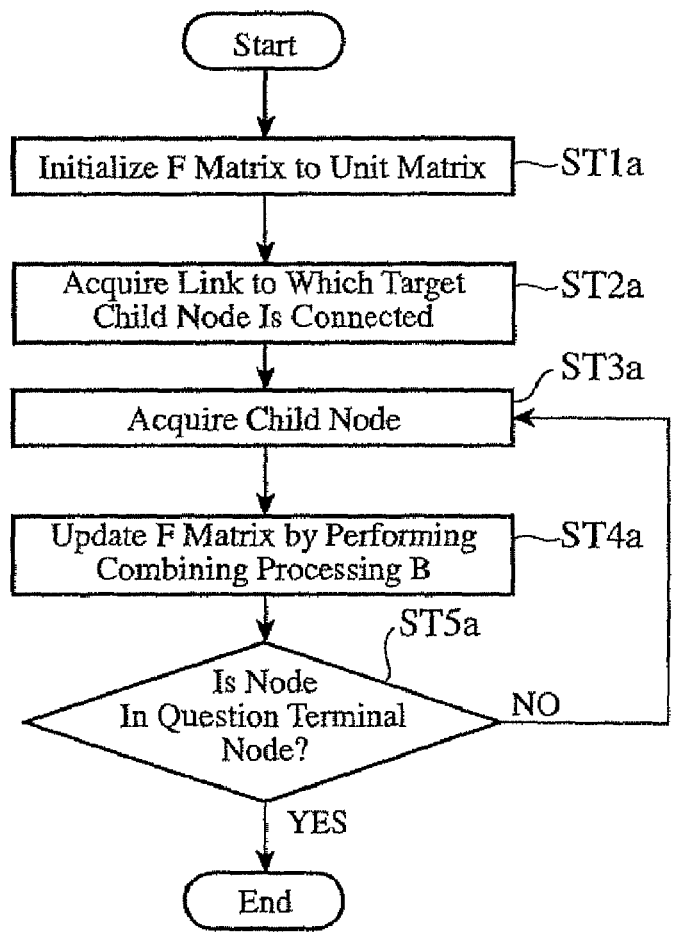
FIG. 17 is a flow chart showing a flow of the combining processing on lower level side.

FIG. 16 is a conceptual diagram of the combining processing on lower level side, and FIG. 17 is a flow chart showing a flow of the combining processing on lower level side. In the combining processing on lower level side, all nodes which are cascaded from a higher level of the hierarchy to a lower level of the hierarchy, as shown in a left-hand side diagram of FIG. 16, are combined so that a combined impedance $Z_L$ equivalently expresses them as shown in a right-hand side diagram of FIG. 16.

Next, the combining processing on lower level side will be explained with reference to FIG. 17.

The transmission characteristics calculating unit 7 initializes an F matrix to the unit matrix (in step ST1a). The transmission characteristics calculating unit 7 then acquires a link to which a child node which is the target of the combining processing on lower level side is linked (in step ST2a), and acquires a child node linked to this link (in step ST3a). After that, the transmission characteristics calculating unit 7 updates the F matrix by performing combining processing B on the acquired child node (in step ST4a).

When, in step ST4a, completing the process of updating the F matrix, the transmission characteristics calculating unit 7, in step ST5a, judges whether the child node which is the target for the processing is a terminal node or a branch mode. At this time, when judging that the child node is not a terminal node, the transmission characteristics calculating unit 7 shifts to the process of step ST3a in which it acquires a child node at a further lower level of the hierarchy, and then performs the process of step ST4a. On the other hand, when judging that the child node is a terminal node, the transmission characteristics calculating unit 7 ends the combining processing on lower level side.

Next, the combining processing B will be explained. The combining processing B is a process of updating the F matrix in a case of performing processing in a direction from a higher level side to a lower level side. In this combining processing B, the following processes are carried out according to the node type of the acquired child node.

(a) When the Acquired Child Node is a General Node

When the current F matrix is expressed as F and the F matrix of the acquired child node is expressed as $F_2$, the transmission characteristics calculating unit 7 updates the F matrix by calculating $F \times F_2$.

(b) When the Acquired Child Node is a Terminal Node

The transmission characteristics calculating unit 7 calculates a combined impedance $Z_L$ using the current F matrix and the impedance Z of the acquired child node (terminal node) according to the above-mentioned equation (4).

(c) When the acquired child node is a branch node

Figure 18:
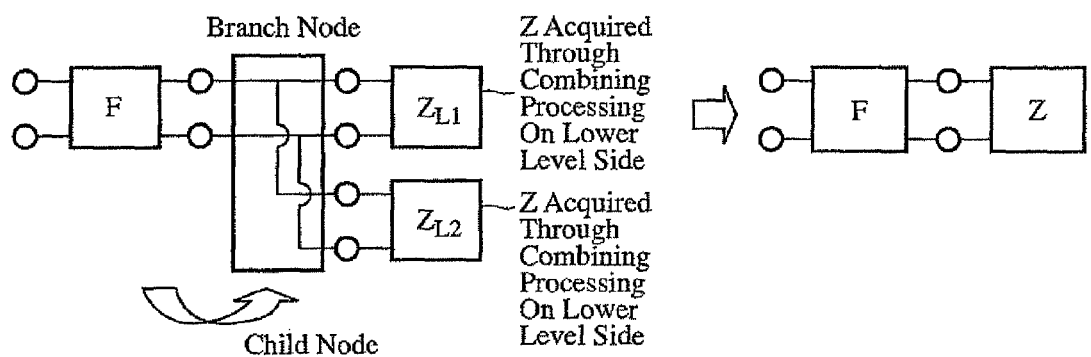
FIG. 18 is a schematic diagram explaining a process of updating an F matrix by performing combining processing B in a case where an acquired child node is a branch node.

The transmission characteristics calculating unit 7 calculates a combined impedance for each of all child nodes at lower levels of the hierarchy which are linked to and branch from the acquired child node (branch node), as shown in FIG. 16. FIG. 18 is a schematic diagram for explaining the process of updating the F matrix through the combining processing B in a case where the acquired child node is a branch node. In the example shown in FIG. 18, the transmission characteristics calculating unit 7 calculates combined impedances $Z_{L1}, Z_{L2}, \ldots$ for all the child nodes at lower levels of the hierarchy which are linked to and branch from the acquired child node.

Since these lower level links are linked in parallel with the acquired child node (branch node) at a higher level of the hierarchy, the transmission characteristics calculating unit 7 calculates the combined impedance Z of the combined impedances $Z_{L1}, Z_{L2}, \ldots$ of the child links according to the above-mentioned equation (7) (see a right-hand side diagram of FIG. 18 shown by an arrow extending from a left-hand side diagram of FIG. 18). The transmission characteristics calculating unit 7 then calculates a combined impedance $Z_L$ from the current F matrix and the calculated combined impedance Z according to the above-mentioned equation (4).

Referring again to FIG. 14, when, in step ST4, judging that the acquired parent node is the transmitting/receiving branch node, the transmission characteristics calculating unit 7 performs end processing A (in step ST5). In the end processing A, the transmission characteristics calculating unit 7 defines the F matrix combined in step ST6 as the combined F matrix $F_2$ of the section starting from the child link of the transmitting/receiving branch node and ending at the receiving link. When completing this end processing A, the transmission characteristics calculating unit 7 ends step 2 of the transmission characteristics calculation processing.

(3) Step 3 of the Transmission Characteristics Calculation Processing

Figure 19:
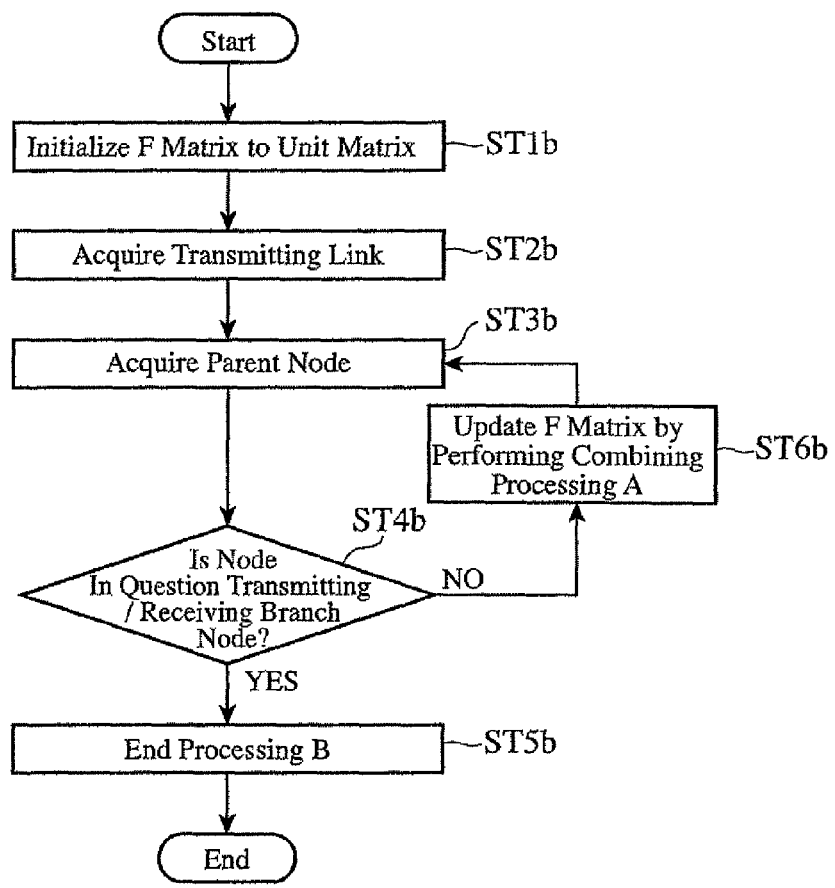
FIG. 19 is a flow chart showing a flow of step 3 of the transmission characteristics calculation processing.

FIG. 19 is a flow chart showing a flow of step 3 of the transmission characteristics calculation processing, and showing the process of combining four-terminal circuits representing nodes in FIG. 13 starting from the transmitting link and ending at the child links of the transmitting/receiving branch node.

First, the transmission characteristics calculating unit 7 initializes an F matrix to the unit matrix (in step ST1b), acquires the transmitting link in the electric distribution system to be processed (in step ST2b), and acquires a parent node linked to this transmitting link (in step ST3b). The transmission characteristics calculating unit 7 then judges whether or not the acquired parent node is the transmitting/receiving branch node on the basis of the node management number A of the transmitting/receiving branch node (in step ST4b).

When, in step ST4b, judging that the acquired parent node is not the transmitting/receiving branch node, the transmission characteristics calculating unit 7 updates the F matrix by performing the above-mentioned combining processing A according to whether the acquired parent node is a general node or a branch node (in step ST6b). When completing the process of updating the F matrix, the transmission characteristics calculating unit 7 returns to the process of step ST3b in which it acquires a parent node at a further higher level of the hierarchy, and then performs the process of step ST4b.

On the other hand, when judging that the acquired parent node is the transmitting/receiving branch node, the transmission characteristics calculating unit 7 performs end processing B (in step ST5b). The end processing B is an end process which is done when four-terminal circuits representing nodes starting from the transmitting link and ending at the child links of the transmitting/receiving branch node are combined.

The F parameter of the updated F matrix define the transmission characteristics of the section starting from the child links (parent side) of the transmitting/receiving branch node and ending at the transmitting link (child side). However, in this section the signal flows in an opposite direction (i.e., in a directing extending from the child side to the parent side). Therefore, in the end processing B, the F parameters (i.e., elements A, B, C, and D) are converted into F' parameters (i.e., elements A', B', C', and D') according to the above-mentioned equation (6) so that the transmission of the signal has transmission characteristics which are reverse to those of the reception of the signal. Then, the F' parameters are defined as the combined F matrix $F_1$ of the section starting from the transmitting link and ending at the child links of the transmitting/receiving branch node. When completing this end processing B, the transmission characteristics calculating unit 7 ends step 3 of the transmission characteristics calculation processing.

(4) Step 4 of the Transmission Characteristics Calculation Processing

Figure 20:
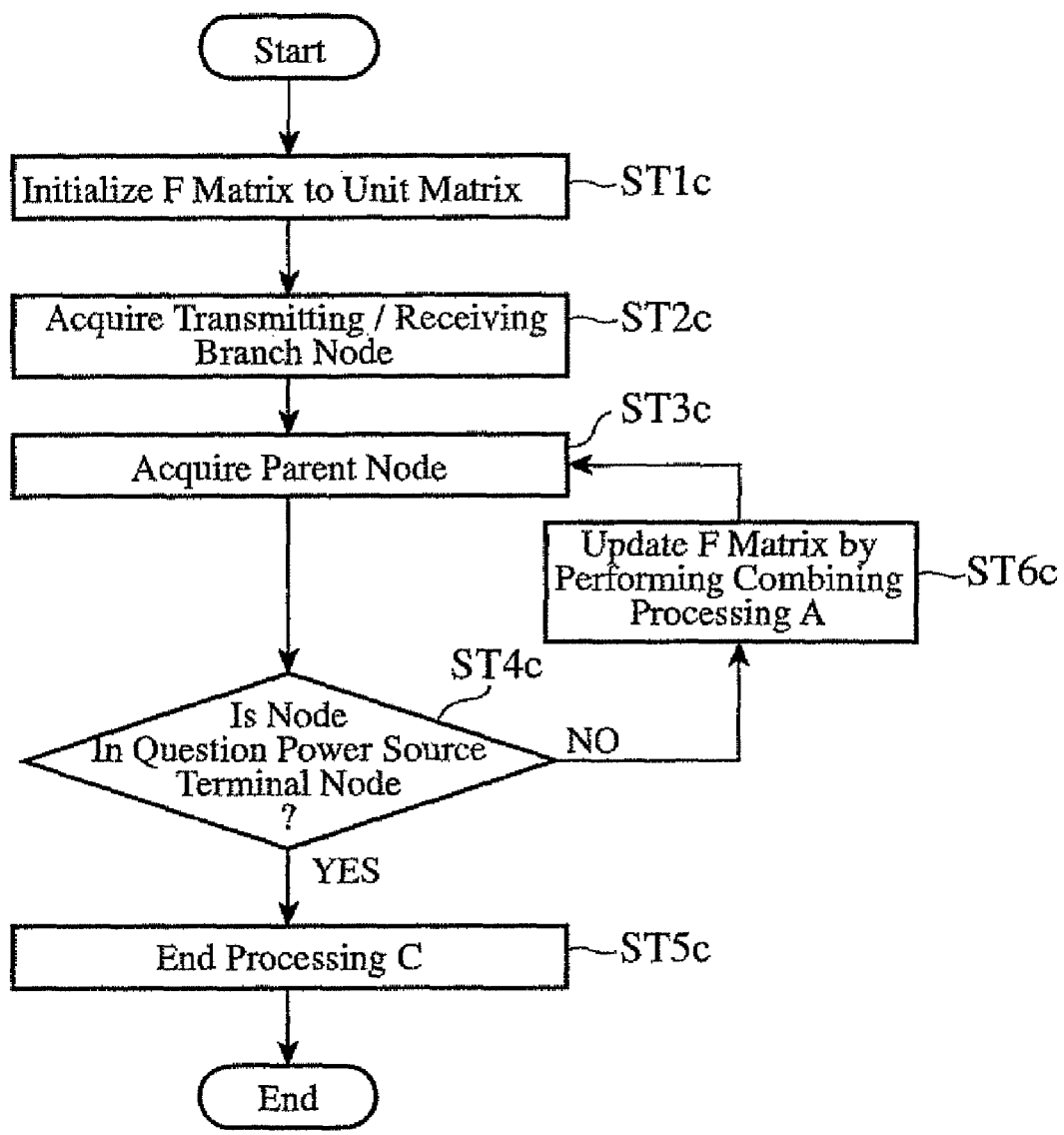
FIG. 20 is a flow chart showing a flow of step 4 of the transmission characteristics calculation processing.

FIG. 20 is a flow chart showing a flow of step 4 of the transmission characteristics calculation processing, and showing the process of combining four-terminal circuits representing nodes in FIG. 13 at higher levels of the hierarchy starting from the parent link of the transmitting/receiving branch node.

First, the transmission characteristics calculating unit 7 initializes an F matrix to the unit matrix (in step ST1c), and acquires the transmitting/receiving branch node (in step ST2c), Next, the transmission characteristics calculating unit 7 acquires the parent node of the transmitting/receiving branch node (in step ST3c), and judge whether or not the acquired parent node is the power source terminal node (in step ST4c). At this time, when judging that the acquired parent node is not the power source terminal node, the transmission characteristics calculating unit 7 updates the F matrix by performing the above-mentioned combining processing A (in step ST6c).

On the other hand, when judging that the acquired parent node is the power source terminal node, the transmission characteristics calculating unit 7 performs end processing C to end the process of Step 4. The end processing C is an end process which is done when four-terminal circuits representing nodes at higher levels of the hierarchy starting from the parent link of the transmitting/receiving branch node are combined.

The F parameter of the updated F matrix define the transmission characteristics of the section starting from the child link (parent side) of the power source terminal node to the parent link (child side) of the transmitting/receiving branch node. However, in this section the signal flows in an opposite direction (i.e., in a directing extending from the child side to the parent side) Therefore, the F parameters (i.e., elements A, B, C, and D) are converted into F' parameters (i.e., elements A', B', C', and D') according to the above-mentioned equation (6) in order to acquire F parameters which define the transmission characteristics when the signal flows from the child side to the parent side. The transmission characteristics calculating unit 7 further calculates a combined impedance Z0 by combining the F' parameters and the virtual impedance Z0 of the power source terminal node. In other words, the transmission characteristics calculating unit 7 substitutes the elements A', B', C', and D' into A, B, C, and D of the above-mentioned equation (4), respectively, and substitutes Z0 into Z so as to calculate $Z_L$ as the combined impedance Z0.

(5) Step 5 of the Transmission Characteristics Calculation Processing

In step 5 of the transmission characteristics calculation processing, the transmission characteristics calculating unit 7 calculates the combined F matrix of the section starting from the transmitting link and ending at the receiving link according to the following equation (8):

$$F_{total} = F_1 \times F_{Z0} \times F_2 \qquad (8)$$

where $$F_{Z0} = \begin{bmatrix} 1 & 0 \\ 1/Z0 & 1 \end{bmatrix}$$

(6) Step 6 of the Transmission Characteristics Calculation Processing

In step 6 of the transmission characteristics calculation processing, the transmission characteristics calculating unit 7 calculates the transmission characteristics of the section starting from the transmitting link and ending at the receiving link according to the following equation (9):

$$20\log|S_{21}| = 20\log\left|\frac{2}{A_{total} + B_{total}/Z_m + C_{total} \cdot Z_m + D_{total}}\right| \qquad (9)$$

where $$F_{total} = \begin{bmatrix} A_{total} & B_{total} \\ C_{total} & D_{total} \end{bmatrix}$$

$Z_m$ = modem impedance

As mentioned above, the transmission characteristics analyzing device according to this embodiment 1 sets up a receiving link and a transmitting link as the transmitting and receiving points of a signal in an electric distribution system to be processed, and automatically grasps a transmitting/receiving branch node on the basis of the node management numbers A and B of nodes linked to these links. The transmission characteristics analyzing device according to this embodiment 1 then divides the electric distribution system to be processed into a "section 1 starting from child links of the transmitting/ receiving branch node and ending at the receiving link" in which the signal flows in the same direction as the power, a "section 2 starting from the transmitting link to the child links of the transmitting/receiving branch node" in which the signal flows in a direction opposite to the direction in which the power flows, and a "section 3 at higher levels starting from the parent link of the transmitting/receiving branch node" on the basis of the transmitting/receiving branch node. Thus, the transmission characteristics analyzing device according to this embodiment 1 can carry out transmission characteristic analysis in consideration of the direction in which the signal flows in the electric distribution system which serves as a communication network.

Embodiment 2

As previously mentioned, the transmission characteristics analyzing device according to embodiment 1 carries out transmission characteristic analysis in consideration of the direction in which the signal flows in the electric distribution system using node management numbers A and B. In contrast, a transmission characteristics analyzing device according to embodiment 2 carries out transmission characteristic analysis in consideration of the direction in which a signal flows in an electric distribution system by setting the direction in which the signal flows to each of nodes after setting up the transmitting and receiving points of the signal.

Although the fundamental structure of the transmission characteristics analyzing device according to embodiment 2 is the same as that of the transmission characteristics analyzing device according to above-mentioned embodiment 1 shown in FIG. 11, the transmission characteristics analyzing device according to embodiment 2 differs from that of embodiment 1 in that for example, a management number setting unit 6 sets up the direction in which the signal flows for each of nodes in the electric distribution system to be processed, instead of assigning node management numbers A and B to each node. As an alternative, using another structural component other than the management number setting unit 6, the transmission characteristics analyzing device can set up the direction in which the signal flows for each of nodes in the electric distribution system to be processed. In this case, the management number setting unit 6 can be omitted.

Figure 21:
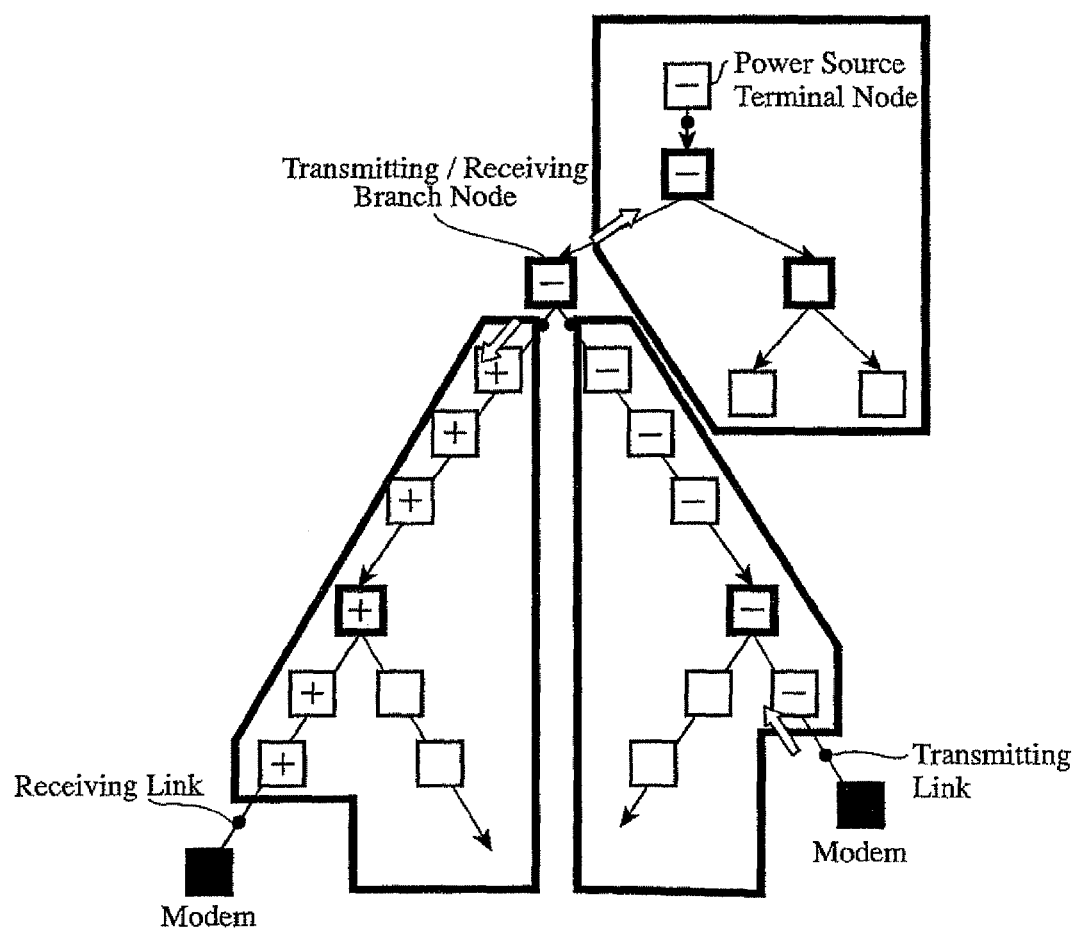
FIG. 21 is a diagram for explaining the outline of a process of setting up the direction in which a signal flows.

Hereinafter, assuming that the management number setting unit 6 sets up the direction in which the signal flows for each of nodes in the electric distribution system to be processed, instead of assigning node management numbers A and B to each node, the operation of the transmission characteristics analyzing device according to embodiment 2 will be explained FIG. 21 is a diagram for explaining the outline of the process of setting up the direction in which the signal flows for nodes. In this embodiment, the target for the transmission characteristics calculation processing is the electric distribution system explained in above-mentioned embodiment 1 with reference to FIG. 2. The management number setting unit 6 according to embodiment 2 sets up the direction in which the signal flows for each of some nodes after the transmitting and receiving points of the signal are set up, instead of assigning node management numbers A and B to each node. It is possible to acquire the transmitting/receiving branch node in the electric distribution system on the basis of the direction in which the signal flows which is set up for each of some nodes.

When the electric distribution system modeling unit 5 generates a tree for the electric distribution system, as shown in FIG. 3 of above-mentioned embodiment 1, and sets up a transmitting link and a receiving link, the management number setting unit 6 automatically assigns the direction in which the signal flows to each node model in this tree. The management number setting unit 6 sets up the direction in which the signal flows according to the following procedure.

(Step 1a) The management number setting unit 6 follows ancestors of the hierarchy in order from the receiving link to set the direction in which the signal flows in each of the parent nodes to "+" (initialization).

(Step 2a) The management number setting unit 6 then follows ancestors of the hierarchy in order from the transmitting link to set the direction in which the signal flows in each of the parent nodes to "−".

According to the transmission characteristic calculation procedure of above-mentioned embodiment 1 including steps 1 to 6, the transmission characteristics calculating unit 7 similarly performs transmission characteristics calculation processing to calculate the transmission characteristics of the electric distribution system. Although the processes in steps 2 to 6 are the same as those of above-mentioned embodiment 1, in step 1 of the transmission characteristic calculation procedure, the transmission characteristics calculating unit 7 searches for parent nodes sequentially from the receiving link, and defines a node where the direction into which the signal flows changes to "−" as the transmitting/receiving branch node.

As mentioned above, although the transmission characteristics analyzing device according to this embodiment 2 needs to set up the direction in which the signal flows to each of some nodes when the transmitting and receiving points of the signal is set up, the transmission characteristics analyzing device according to this embodiment 2 provides the same advantage as offered by that of above-mentioned embodiment 1 even if it does not assign node management numbers A and B to each node.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transmission characteristics analyzing device comprising:
   a transmission characteristics calculating unit
      for determining a direction in which a signal flows in each component of a communication network based on a transmitting point and a receiving point of the signal, the transmitting and receiving points being specified in the communication network, and
      for calculating transmission characteristics of the communication network in consideration of the direction of the signal, wherein said transmission characteristics calculating unit considers each component of the communication network to be a four-terminal circuit in determining the direction in which a signal flows in the component and in calculating the transmission characteristics of the network, and
   a modeling unit for modeling the communication network to be analyzed as including a tree structure, and
      when a component corresponding to the transmitting point of the signal and a component corresponding to the receiving point of the signal are specified in the communication network, said transmission characteristics calculating unit specifies a common ancestor component of the component for the transmitting point of the signal and the component for the receiving point of the signal in the tree structure, and divides the communication network into
- a first section starting from the component corresponding to the transmitting point of the signal and ending at a higher-level common component,
- a second section starting from the component corresponding to the receiving point of the signal and ending at the common ancestor component, and
- a higher-level section starting from the higher-level common component, to determine the direction in which the signal flows in each of the first, second, and higher-level sections.

2. A transmission characteristics analyzing device comprising:

a transmission characteristics calculating unit
for determining a direction in which a signal flows in each component of a communication network based on a transmitting point and a receiving point of the signal, the transmitting and receiving points being specified in the communication network, and
for calculating transmission characteristics of the communication network in consideration of the direction of the signal, wherein said transmission characteristics calculating unit considers each component of the communication network to be a four-terminal circuit in determining the direction in which a signal flows in the component and in calculating the transmission characteristics of the network;

a modeling unit for modeling the communication network to be analyzed as including a tree structure; and a management number setting unit for assigning a management number indicating a hierarchical relation of the tree structure to each of the components of the communication network, wherein said transmission characteristics calculating unit determines
- a direction in which a signal flows in each of the components, based on the management number assigned to each of the components by said management number setting unit, and
- a transmitting point and a receiving point of the signal, which are specified in the communication network.

3. The transmission characteristics analyzing device according to claim 2, wherein said transmission characteristics calculating unit specifies the management number of a higher-level common component at a higher level of the tree structure, which is common to both the component corresponding to the transmitting point of the signal, and the component corresponding to the receiving point of the signal, based on the management number assigned to the component corresponding to the receiving point of the signal and the management number assigned to the component corresponding to the transmitting point of the signal, divides the communication network into
- a first section starting from the component corresponding to the transmitting point of the signal and ending at the higher-level common component,
- a second section starting from the component corresponding to the receiving point of the signal and ending at the higher-level common component, and
- a higher-level section starting from the higher-level common component, based on the management numbers, and determines the direction in which the signal flows in each of the first, second, and higher-level sections.

4. A transmission characteristics analyzing device comprising:

a transmission characteristics calculating unit
for determining a direction in which a signal flows in each component of a communication network based on a transmitting point and a receiving point of the signal, the transmitting and receiving points being specified in the communication network, and
for calculating transmission characteristics of the communication network in consideration of the direction of the signal, wherein said transmission characteristics calculating unit considers each component of the communication network to be a four-terminal circuit in determining the direction in which a signal flows in the component and in calculating the transmission characteristics of the network; and a modeling unit for modeling the communication network to be analyzed as including a tree structure, wherein said transmission characteristics calculating unit
sets a direction in which signals flow in each of the components of the communication network according to a transmitting point and a receiving point of the signals, which are specified in the communication network, specifies a higher-level common component at a higher level of the tree structure, which is common to both the component corresponding to the transmitting point of the signal, and the component corresponding to the receiving point of the signal, based on the direction in which the signal flows, which is set for each component, divides the communication network into
- a first section starting from the component corresponding to the transmitting point of the signal and ending at the higher-level common component,
- a second section starting from the component corresponding to the receiving point of the signal and ending at the higher-level common component, and
- a higher-level section starting from the higher-level common component, and determines the direction in which the signal flows in each of the first, second, and higher-level sections.

5. A computer-readable medium having computer instructions stored therein for execution by a processor to determine a direction in which a signal flows in each component of a communication network based on a transmitting point and a receiving point of the signal, which are specified in the communication network, calculate transmission characteristics of the communication network in consideration of the direction of the signal, wherein each component is considered to be a four-terminal circuit in determining the direction in which a signal flows in the component and in calculating the transmission characteristics of the network, and model the communication network to be analyzed as including a tree structure, and when a component corresponding to the transmitting point of the signal and a component corresponding to the receiving point of the signal are specified in the communication network, specify a common ancestor component of the component for the transmitting point of the signal and the component for the receiving point of the signal in the tree structure, and divide the communication network into
- a first section starting from the component corresponding to the transmitting point of the signal and ending at a higher-level common component,
- a second section starting from the component corresponding to the receiving point of the signal and ending at the common ancestor component, and
- a higher-level section starting from the higher-level common component, to determine the direction in which the signal flows in each of the first, second, and higher-level sections.

6. A computer-readable medium having computer instructions stored therein for execution by a processor to determine a direction in which a signal flows in each component of a communication network based on a transmitting point and a receiving point of the signal, which are specified in the communication network, calculate transmission characteristics of the communication network in consideration of the direction of the signal, wherein each component is considered to be a four-terminal circuit in determining the direction in which a signal flows in the component and in calculating the transmission characteristics of the network, model the communication network to be analyzed as including a tree structure, assign a management number indicating a hierarchical relation of the tree structure to each of the components of the communication network, and determine
- a direction in which a signal flows in each of the components, based on the management number assigned to each of the components, and
- a transmitting point and a receiving point of the signal, which are specified in the communication network.

7. The computer-readable medium according to claim 6, further including computer instructions stored therein for execution by a processor to specify the management number of a higher-level common component at a higher level of the tree structure, which is common to both the component corresponding to the transmitting point of the signal, and the component corresponding to the receiving point of the signal, based on the management number assigned to the component corresponding to the receiving point of the signal and the management number assigned to the component corresponding to the transmitting point of the signal, divide the communication network into
- a first section starting from the component corresponding to the transmitting point of the signal and ending at the higher-level common component,
- a second section starting from the component corresponding to the receiving point of the signal and ending at the higher-level common component, and
- a higher-level section starting from the higher-level common component, based on the management numbers, and determine the direction in which the signal flows in each of the first, second, and higher-level sections.

* * * * *